United States Patent [19]

Propst et al.

[11] 4,285,624

[45] Aug. 25, 1981

[54] TRASH COLLECTION AND MANAGEMENT SYSTEM FOR AN OFFICE ENVIRONMENT

[75] Inventors: Robert L. Propst; Paul L. Propst, both of Ann Arbor, Mich.

[73] Assignee: Herman Miller, Inc., Zeeland, Mich.

[21] Appl. No.: 28,256

[22] Filed: Apr. 9, 1979

[51] Int. Cl.$^{3}$ .................... B65G 67/40; B65D 43/16; B60D 1/14

[52] U.S. Cl. .................................. 414/362; 220/1 T; 220/334; 280/408; 280/491 B

[58] Field of Search ............... 414/403, 420, 421, 422, 414/425, 354, 362, 364, 365, 575, 577, 582, 583; 280/408, 479 A, 489, 491 B, 494; 220/1 T, 334

[56] References Cited

U.S. PATENT DOCUMENTS

| | | | |
|---|---|---|---|
| 3,342,358 | 9/1967 | French et al. | 414/420 |
| 3,627,352 | 12/1971 | Canole | 280/491 B |
| 4,186,844 | 2/1980 | Swanson | 220/1 T X |

*Primary Examiner*—Robert G. Sheridan

*Attorney, Agent, or Firm*—Olsen and Stephenson

[57] ABSTRACT

A trash collection, management and disposal system for an office area including covered trash collector containers positioned at heights substantially equivalent to the height of a standard desk top and adapted to receive trash generated in the area. Some of the trash collector containers are mounted on wheels and are equipped with tongue-and-hitch assemblies enabling a plurality of these trash collector containers to be coupled together in a train for towing to a dump site. Dump mechanisms at the dump site pick the trash collector containers up and invert them to empty the trash contained therein. The cover on each collector container is pivotally mounted by a hinge assembly enabling the cover member to be moved to an over center position when it is opened to inhibit its return movement to the closed position. Also, the hinge assembly operates to maintain the cover in an upright position when it is opened, allowing the cover to serve as a backstop for deflecting thrown trash into the container.

5 Claims, 18 Drawing Figures

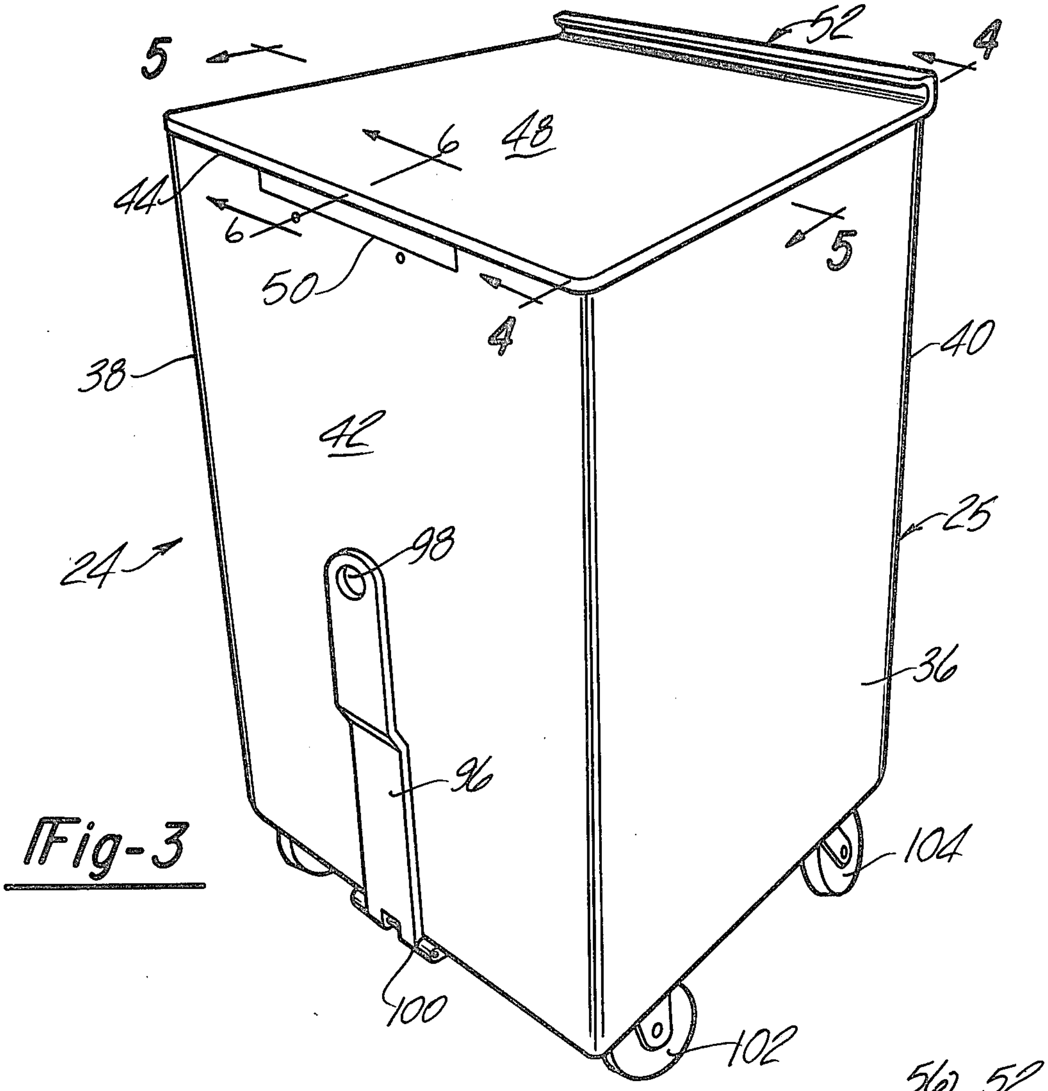
Fig-3
Fig-4
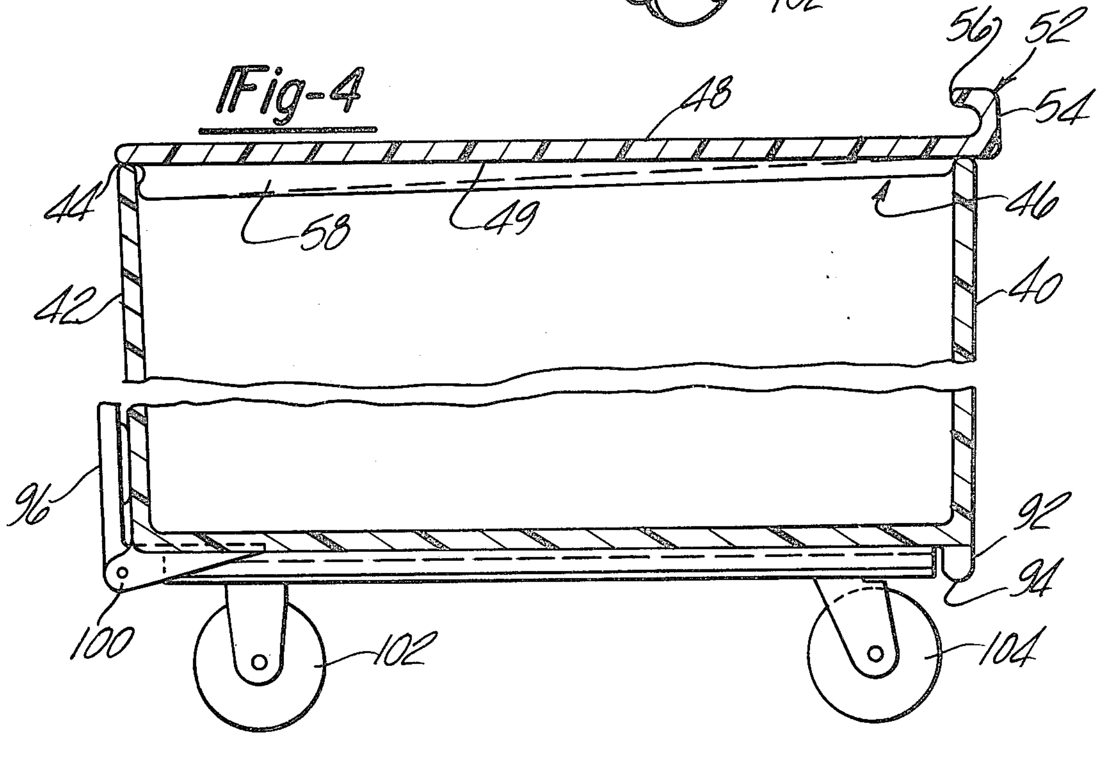

Fig-15
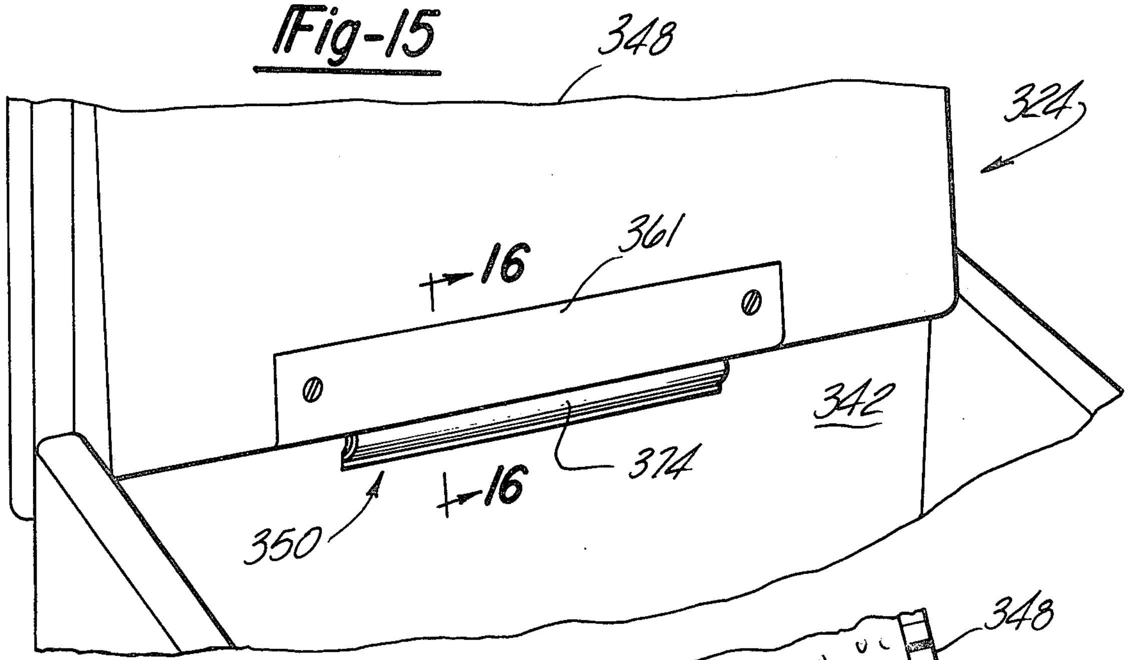
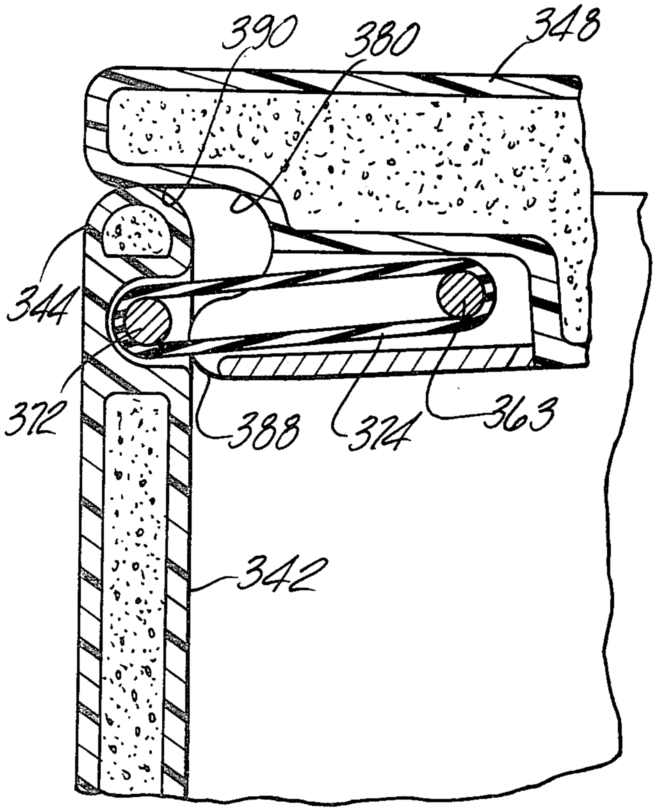
Fig-16
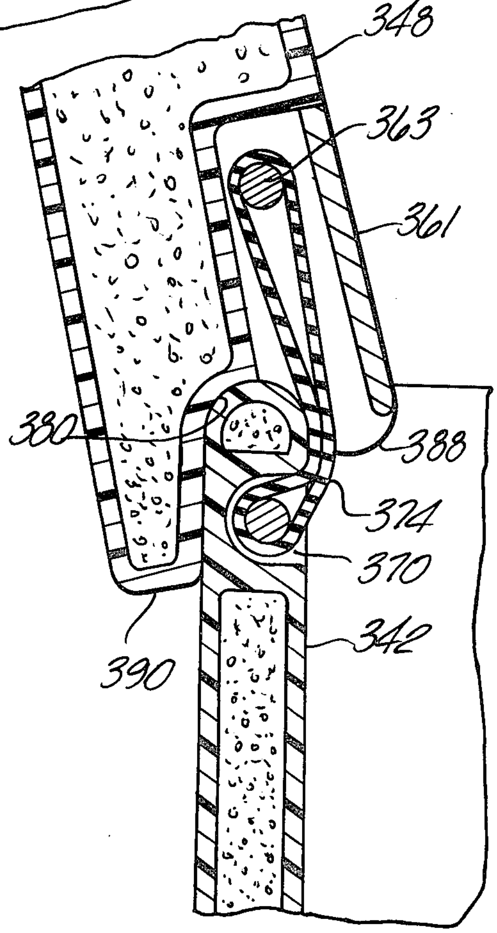
Fig-17

TRASH COLLECTION AND MANAGEMENT SYSTEM FOR AN OFFICE ENVIRONMENT

BACKGROUND OF THE INVENTION

The present invention relates to a trash collection, management and disposal system.

In office work areas, especially those work areas where substantial quantities of scrap paper and various other types of trash are generated, the collection, transportation and disposal of the trash is a task whose cost to the business may achieve significant proportions. Nevertheless, management rarely devotes significant attention to the handling of trash because it rarely appreciates that worthwhile cost savings can be realized with improved trash disposal systems. Management generally takes the view that engineering and product development personnel better spend their time in projects related more directly to the primary purpose of the enterprise. Trash disposal is viewed as an incidental activity capable of being carried out in the conventional manner. Hence, little if any thought is devoted to ways of collecting, transporting and disposing of trash in an efficient manner which takes into account the needs of all employees.

It is widely held that pleasant work surroundings increase employee morale and efficiency. The custodial staff is also an important element in a profitable business. Providing these employees with a waste management system that involves the entire work force lightens their work load, increases their morale and motivates them to work with greater efficiency.

Identified deficiencies in present trash handling systems include:

employment of open waste baskets whose short height and limited capacity are not compatible in offices where large quantities of trash are generated;

employment of open waste baskets which are unsightly and can be a source of contamination and unpleasant odors in the work area;

positioning of waste baskets adjacent to walls allows personnel to use the walls as back-stops against which trash can be thrown for deflection into the waste baskets resulting in soiled walls; and inefficient modes of transferring the trash from the waste baskets and other collectors where it is originally deposited to the final dump site.

It is the general object of the present invention, therefore, to provide an integrated trash collection, management and disposal system.

It is another object of the present invention to provide a trash management system enabling a minimum number of trash transfers.

It is another object of the present invention to provide an improved trash collection container which is durable, mobile and easily handled by custodial personnel.

It is another object of the present invention to provide a trash collection container having an improved hinge assembly pivotally mounting a cover on the container.

SUMMARY OF THE INVENTION

In accordance with the present invention, an integrated trash collection, management and disposal system is provided allowing trash that is generated in an office environment to be efficiently collected and forwarded to a remote dump site with a minimum amount of handling and load transferring. A conventional office environment usually consists of a plurality of individual offices having work areas where scrap paper and various other types of trash are generated. An important objective of the trash collection feature of this invention is to provide trash collector containers whose upper ends are essentially at the height of the desk tops to facilitate disposal of trash in the containers.

The trash collector containers have covers that are hingedly mounted on a box receptacle. The covers are movable to an upright open position and serve as a backstop off which thrown trash can deflect into the container. Consequently, the open cover serves to protect the walls from being soiled when the trash container is stationed against a wall.

Some of the trash collector containers are mounted on wheels and are easily pushed along the walkways to locations where the custodial personnel can if necessary empty other other waste baskets into the trash collector containers. The wheeled trash collector containers each have a tongue-and-hinge assemblies so that a plurality of wheeled trash collector containers can be coupled in a train for towing to a remote dump site. A dump mechanism is provided at the dump site to invert the containers emptying them of their contents. Subsequent to being emptied, the mobile trash collector containers are hauled to a wash station where they are cleaned before being returned to their designated locations.

The hinge assembly which pivotally connects the cover to the container includes a flexible hinge member, usually formed of resilient material such as rubber. The hinge assembly cooperates with the cover and the container to apply a forwardly directed force on the cover in its open position to restrain further rearward pivoting of the cover. The hinge assembly also provides for the positioning of the cover in the open position in an over center position in which the center of gravity of the cover is located rearwardly of the rear edge of the container opening. This over the center positioning of the cover inhibits its return movement to the closed position. Accordingly, a manual closing of the cover is normally required. In one illustrated embodiment of this invention, the hinge assembly has a breakaway construction whereby a predetermined amount of separating or pulling force applied to the cover will detach the cover from the container. The hinge assembly readily can be reattached. The breakaway hinge construction prevents damage to the container through an accidental or intentional separation of the cover from the container.

Further objects, features and advantages of the present invention will become apparent from a consideration of the following description when taken in connection with the appended claims and the accompanying drawings in which:

FIG. 1 is a perspective view of an office environment in which the trash collection, management and disposal system of the present invention is employed;

FIG. 2 diagramatically illustrates a dump site and wash station to which trash collector containers of the present invention are hauled for emptying and cleaning;

FIG. 3 is a perspective view of a trash collector container employed in this invention;

FIG. 4 is a foreshortened longitudinal sectional view of the trash collector container of this invention as seen substantially from line 4—4 in FIG. 3;

FIG. 15 is a perspective view of the trash collector container of the present invention showing another form of the hinge assembly of the present invention;

FIGS. 16 and 17 are sectional views of the hinge assembly taken substantially from lines 16—16 in FIG. 15 illustrating the cover in closed and opened positions respectively.

Figure 1:
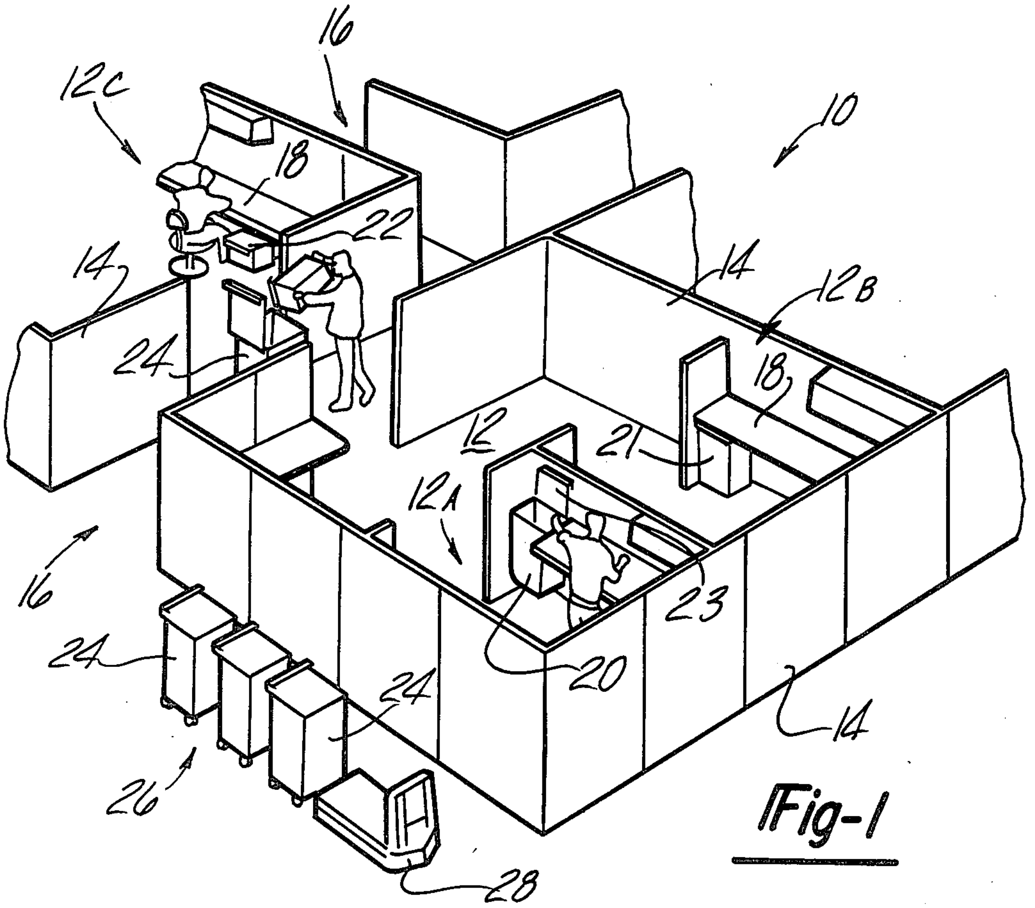

Referring to the drawing, the trash collection, transportation, management and disposal system of the present invention is shown for use in an office or similar work environment such as the office indicated generally at 10 in FIG. 1. The office environment 10 includes individual offices 12 formed by interconnected wall panels 14. Walkways or corridors 16 provide passageways through which personnel and materials move. Each office 12 has work areas such as the desktops 18. With the usual machinery and office equipment, scrap paper and a variety of other types of trash are generated throughout the work day. The trash collection, transportation, management and disposal system of the present invention achieves increased efficiency in removing the trash from the office environment 10 to a remote dump site 30 (FIG. 2) with as few handlings as possible.

The trash collection, transportation and disposal system, sometimes referred to as "the trash removal system" consists of trash collector containers 24 which can be positioned in the offices 12 for storing trash generated in the offices 12. Each trash collector container 24 has a height substantially equivalent to the height of the desks 18. Accordingly, when the trash collector containers 24 are strategically positioned in the offices 12, the workers can easily deposit the trash in the containers 24 without wasting time in locating the trash container.

Auxiliary trash collection containers 20 and 22 are integrated into the trash removal system to meet the particular needs of an office 12. In keeping with the objective of positioning the trash containers near the location where the trash is generated, the auxiliary containers 20 and 22 are each positioned so that its upper end is essentially at desk top height.

In the office 12A, the container 20, which is similar in construction to the container 24, is hung on a wall panel 14 adjacent to the desk 18. In the office 12B, a container 21 is positioned beneath the desk 18 and can be easily pulled from beneath the desk 18 for receiving waste and for emptying. The container 22 in the office 12C is a drawer type container which is slidably mounted beneath the desk 18 for movement beyond the desk 18 in order to receive scrap. When possible, the containers 20, 21 and 22 are positioned off the floor thereby allowing the floor space to be committed for other uses. Also, suspending the containers 20 and 22 above the floor facilitates the cleaning of the floor since the cleaning people will have fewer objects to move around.

Figure 2:
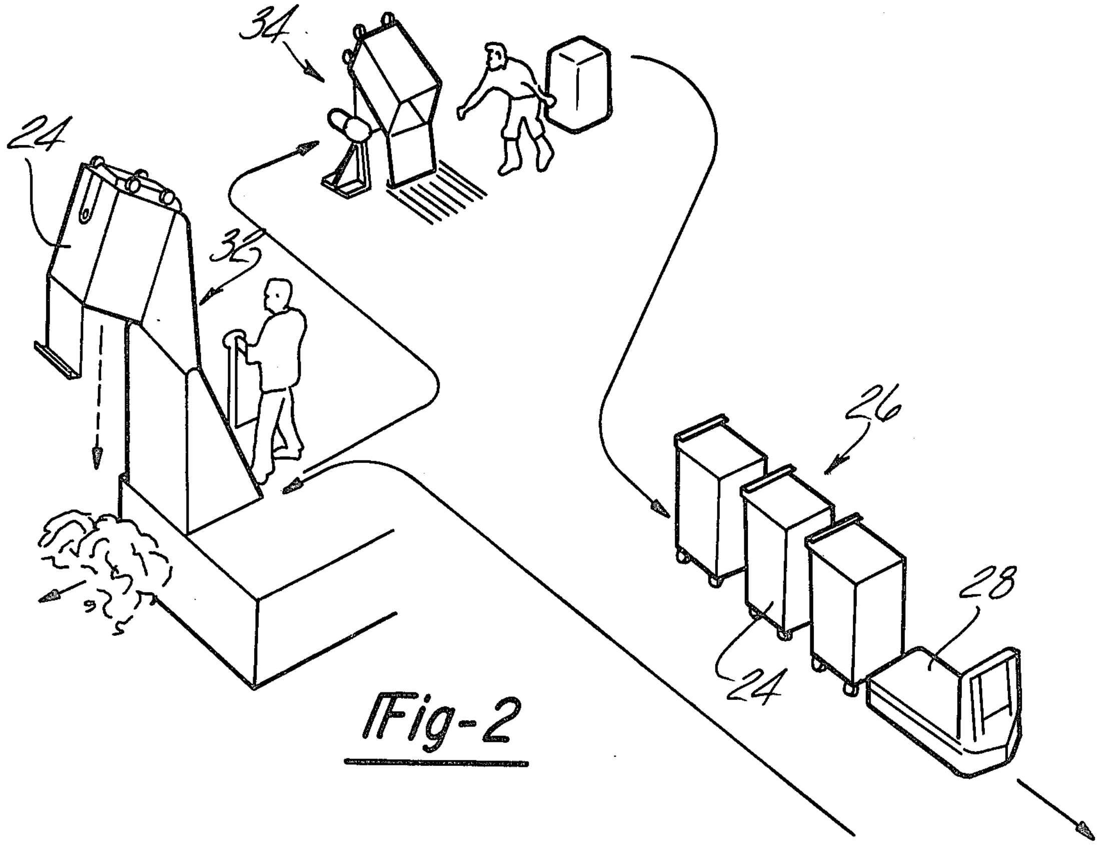

The trash collector containers 24 which are mounted on wheels are equipped with hitch-and-tongue assemblies enabling a plurality of the containers 24 to be coupled in a train 26 and towed such as by a motorized tug 28 to a remotely located dump site 30, as seen in FIG. 2. A dump mechanism 32 is positioned at the dump site 30 and each mobile container is releasably attached to the dump mechanism 32 which operates to invert the container 24 to empty it of its contents. After each container 24 is emptied, it is rolled to a wash station 23 where it is cleaned. The trash collector containers 24 are then recoupled into the train 26 and returned to their designated locations. Strategic positioning of the trash collector containers 20, 21, 22 and 24 reduces the number of handling events required to collect and transport the waste to the dump site 30 since the containers 24 serve as primary collectors and transporters of the trash.

Each collector container 24, as seen in FIGS. 3-6, includes a receptacle 25 of a box shape having side walls 36 and 38, a front wall 40 and a rear wall 42 terminating at its upper end in a rear edge 44. The container 24 has an open upper end 46 into which the trash is deposited. The box shape of the receptacle 25 more readily accepts boxes or similarly configured waste material. Thus, the capacity of each container is fully utilized. The open upper end 46 of the container, which is defined by the upper edges of the walls 36, 38, 40 and 42, is closed by a cover 48 that is pivotally mounted to the back wall 42 of the container 24 at its rear upper edge 44 by a hinge assembly 50. The cover 48 has a handle 52 that extends along the entire front edge of the cover 48. The handle 52 consists of an upright web portion 54 terminating at a rearwardly extending gripping portion 56 located a sufficient distance above the upper surface of the cover 48 so as to be easily grasped for opening and closing.

Figure 5:
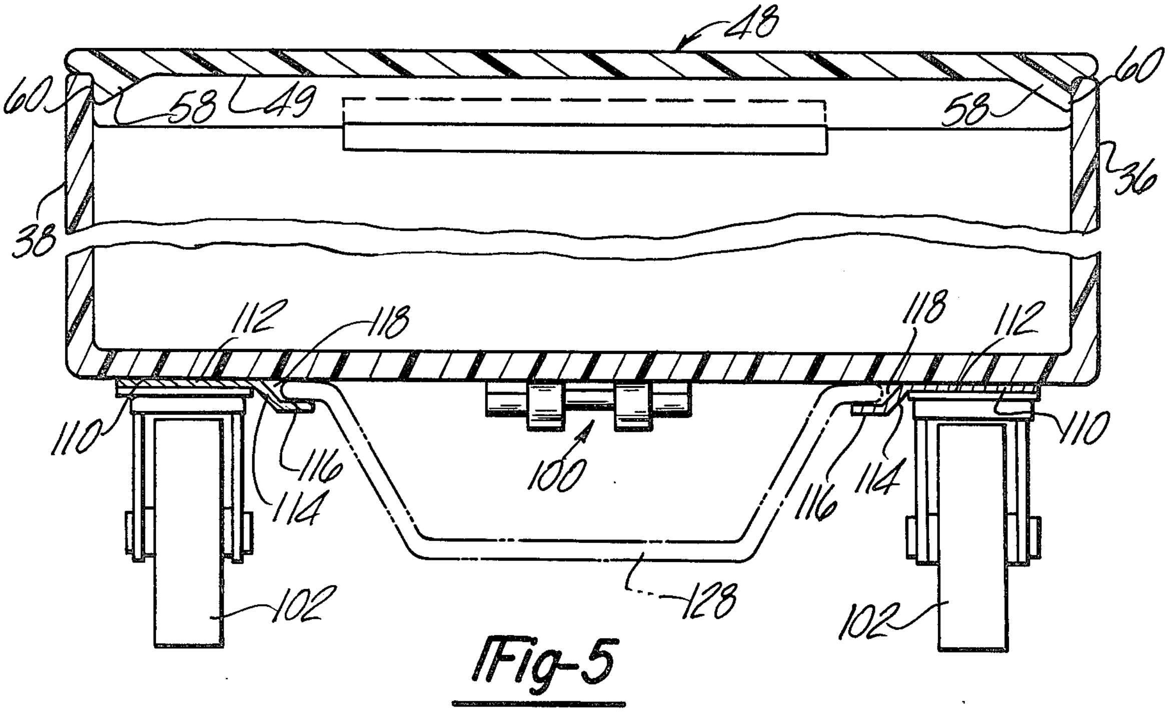
FIG. 5 is a foreshortened sectional view of the trash collector container of this invention as seem from line 5—5 in FIG. 3 and also illustrating in broken lines the engagement of a portion of a dump mechanism for emptying the container.

The cover 48 has a pair of transversely spaced flange portions 58 extending downwardly from its underside 49, as seen in FIG. 5. The flange portions 58 are essentially parallel with the side walls 36 and 38 and have opposing faces 60 which span a distance that is slightly less than the distance between the inner surfaces of the side walls 36 and 38 so that when the cover 48 is closed, the faces 60 of the flange portions 58 will be positioned adjacent to the side walls 36 and 38. As a result, the side-to-side movement of the cover member 48 when it is closed is constrained.

Figure 6:
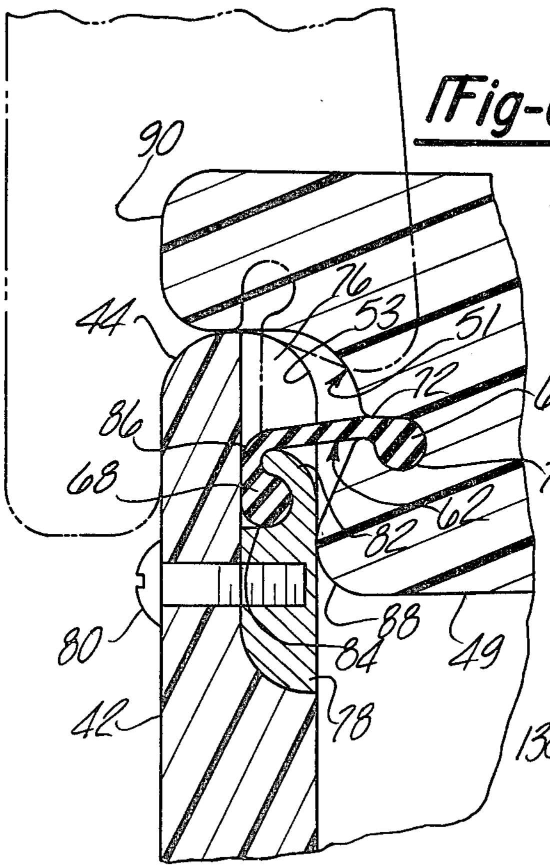
FIG. 6 is a sectional view of a hinge assembly which connects the cover to the collector container as seen from line 6—6 in FIG. 3 showing in solid line the cover in a closed position and showing in broken lines the cover in its upright opened position.

The rear edge 51 of the cover 48, as seen in FIG. 6, is formed having a trough configuration with a concave bearing surface 53 which rides on the curved rear edge 44 of the back wall 42 as the cover 48 is opened and closed. The hinge assembly 50 includes a flexible hinge member 62, which may be formed of rubber or similar resilient material, and retaining means on the cover 48 and on the back wall 42 which secures the hinge member 62 to the cover 48 and to the back wall 42. The flexible hinge member 62 has a main body 64 terminating at enlarged end portions 66 and 68. The retaining means includes a cavity 70 formed in the cover 48 at its rear edge 51. The cavity 70 has a reduced neck portion 72. The enlarged end portion 66 of the hinge member 62 is disposed in the cavity 70 with the main body 64 portion extending through the reduced neck portion 72. A recess 76 is formed along the inner surface of the back wall 42 and receives a plate member 78 which is secured to the back wall 42 by screws 80 (one shown). The plate 78 terminates along its upper end in a curved portion 82 that curves toward the back wall 42 and cooperates with the upright inner surface of the recess 76 to define a cavity 84 having a reduced neck portion 86 into which the end portion 68 of the hinge member 62 is positioned.

The cover 48 is shown in FIG. 6 in an upright open position in broken lines and is shown in its closed position in solid lines. The cover 48 has extending rearwardly at its lower side 49 a projection 88 which abuts against the plate member 78 when the cover 48 is closed. The interfering relationship between the projection 88 and the flange 78 along with the appropriate length of the body 64 stretches the hinge member 62 causing it to apply rearwardly directed forces against the hinge cover 48 to maintain the end portion 88 in abutting relationship with the plate 78.

The upper portion of the rear edge 51 of the cover 48 is provided with an extension 90 which engages the outside surface of the wall 42 in the open position so as to prevent further rearward pivoting of the cover 48. The hinge member 62 and the extension 90 cooperate to maintain the cover member in its upright position. The hinge member 62, in the open position of the cover 48, again is stretched to apply a forwardly directed force to the cover 48, which cooperates with the extension 90 to inhibit further rearward pivoting of the cover 48. In the open position, the center of gravity of the cover 48 is located slightly rearwardly of the rear edge 44 of the back wall 42. This over the center positioning of the cover 48 inhibits the return movement of the cover to its closed position. Consequently, an unanticipated closing of the cover 48 will be avoided.

The effective opening of the neck portion 86 is such that if an excessive amount of pulling force is exerted on the hinge member 62, the end portion 68 will be compressed and pulled through the neck portion 86. Thus, if an excessive pulling force is applied to the hinge member 62 by forcing the cover 48 beyond its open position, or by pulling it in any other fashion, the hinge member 62 will be pulled from the cavity 84 to prevent damage to the hinge assembly 50. A subsequent loosening of the screws 80 and partial removal of the plate 78 will enable the repositioning of the end portion 68 in the cavity 84 to reattach the cover 48 to the receptacle 25.

Each trash collector container 24 includes a downwardly extending hitch pin 92 located at its front lower end below the front wall 40. The hitch pin 92 has a rounded nose portion 94. A tongue member 96 having a pin receiver opening 98 is pivotally mounted on a spring biased tongue mount 100. The tongue mount 100 urges the tongue 96 to an upright position adjacent the rear wall 42. The containers 24 can be coupled to form the train 26 by pivoting the tongue 96 on one container 24 downwardly to a position below the hitch pin 92 on the adjacent container 24. When the opening 98 is substantially aligned with the hitch pin 92, the tongue 96 is released enabling the spring loaded tongue mount 100 to raise the tongue 96 with the rounded nose 94 operating to guide the opening 98 to receive the pin 92. The containers 24 can be uncoupled merely by lowering the tongue 96 and separating the coupled containers 24.

Each collector container 24 is mounted on four wheels positioned at the corners of the receptacle 25. Two back wheels 102 are mounted in fixed positions and have coincidental horizontal axes of rotation 102A. The wheels 102 cannot swivel about an upright axis. The two front wheels 104 are castor wheels having upright swivel axes enabling the container 24 to track in curved paths. With the tongue 96 in its substantially horizontal position, the perpendicular distance from the hole 98 to the axes 102A is substantially equal to the perpendicular distance from the hitch pin 92 to the axes 102A. This dimensional relationship ensures that each container 24 will track in a curved path that is identical to the curved path through which the preceding container 24 traveled. As a result, the train 26 will not cut across a corner through which it is pulled.

A pair of transversely spaced bracket members 110, each having a mounting portion 112 and a downwardly extending depending portion 114 that terminates in a horizontal flange 116, are mounted at opposite sides of the container 24. The flanges 116 cooperate with the underside of the bottom wall of the container 24 to define guideways 118.

Figure 7:
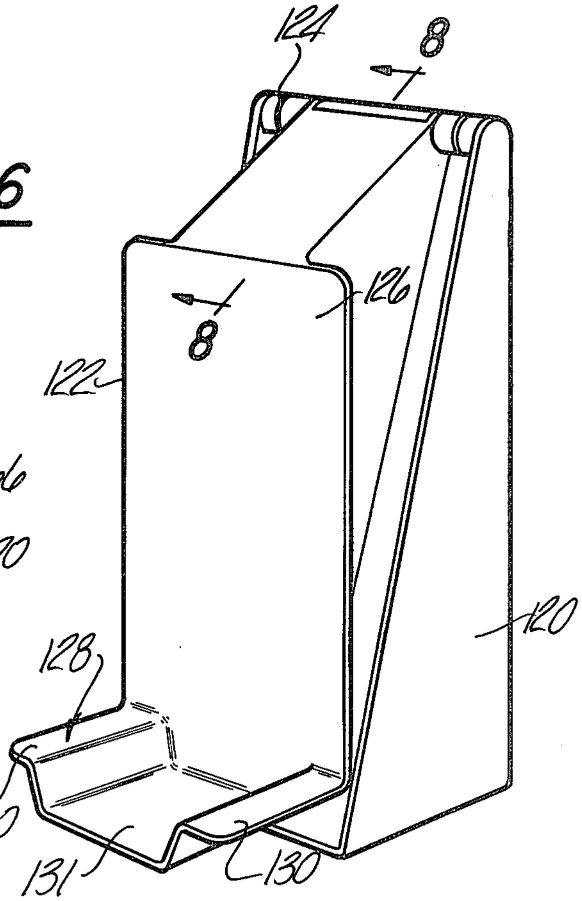
FIG. 7 is a perspective view of the dump mechanism employed in the present invention.
Figure 8:
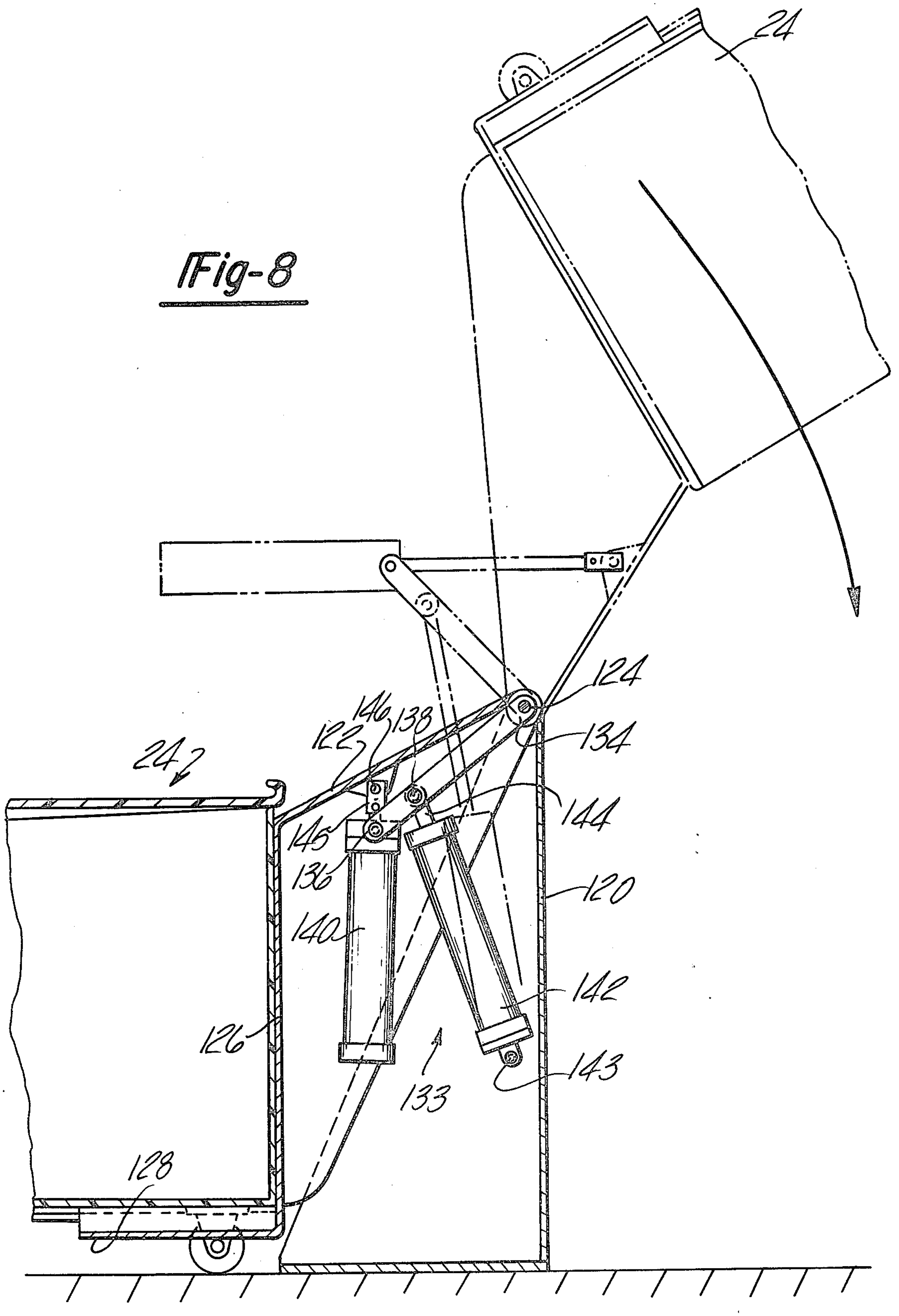
FIG. 8 is a sectional view of the dump mechanism taken substantially from line 8—8 in FIG. 7 showing in solid line the dump mechanism and a trash collector container in an upright position and showing in broken lines the trash collector container in an inverted position for emptying its contents.

The dumping mechanism 32, as seen in FIGS. 7 and 8, comprises a stand member 120 having a support member or throw arm 122 pivotally connected at the upper end of the stand member 120 by a hinge assembly 124. The throw arm 122 has an upright plate portion 126 and a transversely extending support portion 128. The support portion 128 is generally U-shaped having opposing outwardly extending flanges 130 connected by a web portion 131. The flanges 130 are positionable in the guideways 118 when the container 24 is rolled against the plate portion 126 to be releasably mounted on the throw arm 122. The U-shaped configuration of the support portion 122 establishes a clearance between the bottom wall of the container 24 and the web portion 131 to accommodate the tongue mount 100.

As seen in FIG. 8, the dump mechanism 32 is provided with a lift assembly 133 which includes a link member 132 pivotally connected at one end 134 to the hinge assembly 124. The other end 136 of the link member 132 is connected to and carries a fluid actuated cylinder 140. A second fluid actuated cylinder 142 is pivotally mounted at pivot 143 to the stand member 120 and has a piston rod 144 connected to the link member 132 at pivot 138 intermediate the ends 134 and 136 of the link member 132. The cylinder 140 has its piston rod 145 connected to the throw arm 122 at pivot 146. The container 24 is moved from its upright position to an inverted emptying position through extension of the piston rods 144 and 145 of the fluid actuated cylinders 140 and 142. The fluid cylinder 142 pivots the link member 132 clockwise, as seen in FIG. 8, thereby elevating both the cylinder 140 and the throw arm 122. The extension of the cylinder 140 further pivots the throw arm 122 clockwise to a position in which the container 24 is inverted for emptying its contents. As the throw arm 122 is pivoted clockwise, the plate portion 126 provides the primary support when the container 24 is oriented on its side. When inverted, the interlocking relationship between the flanges 130 on the support portion 128 and the guideways 118 supports the container 24 in the inverted position. The height of the flanges 130 from the floor correspond with the height of the guideways from the floor enabling the insertion of the flanges 130 into the guideways 118 merely by rolling the container against the plate portion 126 when the throw arm 122 is in the down position.

Figure 11:
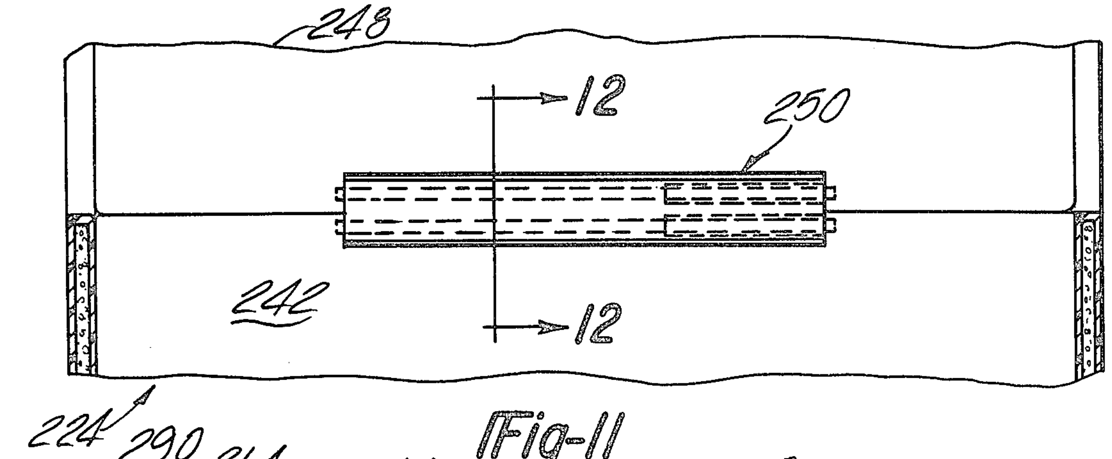
FIG. 11 is a fragmentary front elevational view of a collector container showing the cover in an open position and illustrating another embodiment of the hinge assembly of the present invention.
Figure 12:
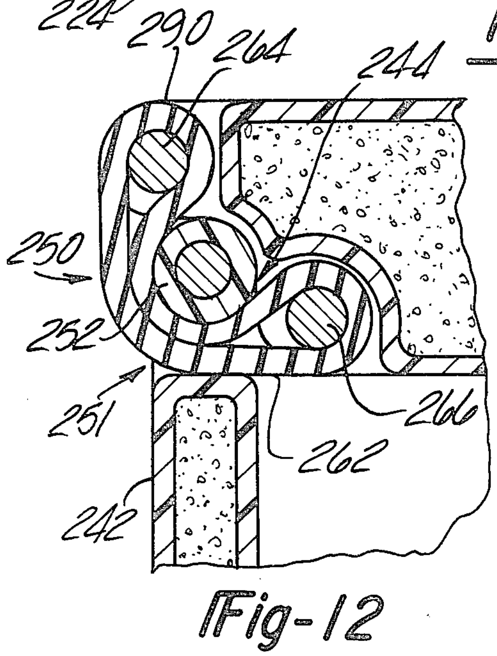
FIGS. 12 and 13 are sectional views of the hinge assembly taken substantially from lines 12—12 in FIG. 11 showing the cover member in closed and opened positions respectively.
Figure 13:
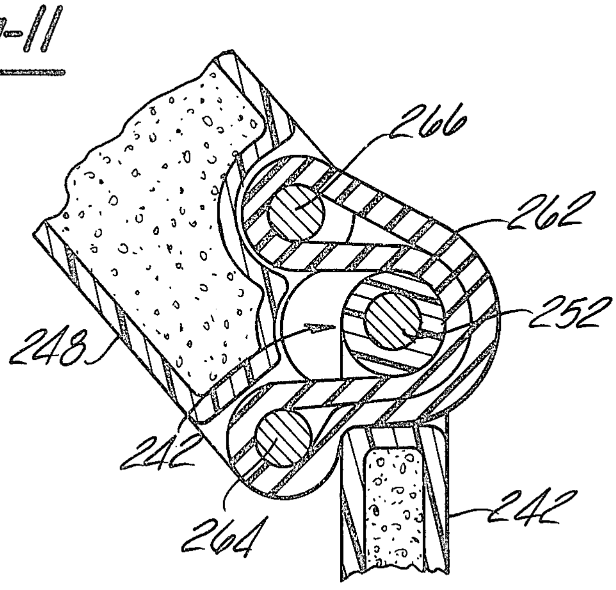

A trash collector container 224 identical to the container 24 but having a modified hinge assembly 250 is shown in FIGS. 11–13. The hinge assembly 250 includes means forming a horizontal opening 251 through the back wall 242 of the container 224. Positioned along the upper rear edge 244 of the container 224 is a horizontal rod member 252. A flexible hinge member 262 is provided having a sleeve-like construction with open ends. A pair of longitudinally extending pin members 264 and 266 are releasably mounted on the cover member 248 adjacent its rear edge. The pin members 264 and 266 are laterally and vertically displaced when the cover 248 is closed, as seen in FIG. 12. The pin members 264 and 266, which are parallel to the rod 252, extend through the hinge member 262. The hinge member 262 extends between the pin members 264 and 266 through the opening 251 so that the rod 252 is located between the hinge member 262 and the cover 248. Like the hinge assembly 50, the hinge assembly 250 cooperates to permit an opening movement of the cover member 248 to an over center position as illustrated in FIG. 13 where the center of gravity of the cover 248 is located rearwardly of the rear edge 244 of the container 244. The cover 248 has an upper rear portion 290 that engages the back wall 242 in the open position of the cover 248 and cooperates with the hinge member 262 to prevent further rearward displacement of the cover member 248. When the cover 248 is in its upright open position, as seen in FIG. 13, the hinge member 262, which is formed of resilient material, is placed in tension to apply a forwardly directed force on the cover 248.

A trash collector container 324 having a modified hinge assembly 350 is illustrated in FIGS. 15–18. The container 324 has a cover member 348 with a recess 360 formed in its lower side 349 that is covered by a plate 361 having a pair of laterally spaced mounting lugs 362 into which a dowel member 363 is positioned. The dowel member 363 has telescoping portions 364 and 366 which are spring biased outwardly so that a compressing force at the ends of the dowel 363 will shorten its length enabling its positioning in the lugs 362. The rear wall 342 of the container 324 has a horizontal slot 370, formed below the rear upper edge 344 of the back wall 342 into which a dowel 372 similar to the dowel 363 is disposed. A flexible sleeve-like hinge member 374 having open ends 376 and 378 receives the dowel members 363 and 372 for connecting the cover 348 to the rear wall 342.

As seen in FIGS. 16 and 17, the rear edge of the cover 348 has a trough shaped bearing surface 380 which rides on the rear edge 344 of the back wall 342 when the cover 348 is pivoted between the open and closed positions. The cover 348 has a rear stop portion 390 extending rearwardly from the cover 348 which engages the back wall 342 in the open position of the cover 348 to prevent further rearward pivoting of the cover 348. The flexible hinge member 374 also applies a forwardly directed force to the cover 348 in its open position to prevent further rearward pivoting of the cover 348 from its open position. The cover 348, when moved to its open position, is in an over center position in which the center of gravity of the cover member 348 is located rearwardly of the rear edge 344 of the back wall 342. The cover member 348 also has a mating portion 388 located at its rear edge 341 which engages the inner surface of the back wall when the cover member 348 is closed. This engagement establishes an interfering relationship between the cover 348 and the back wall 342.

Figure 14:
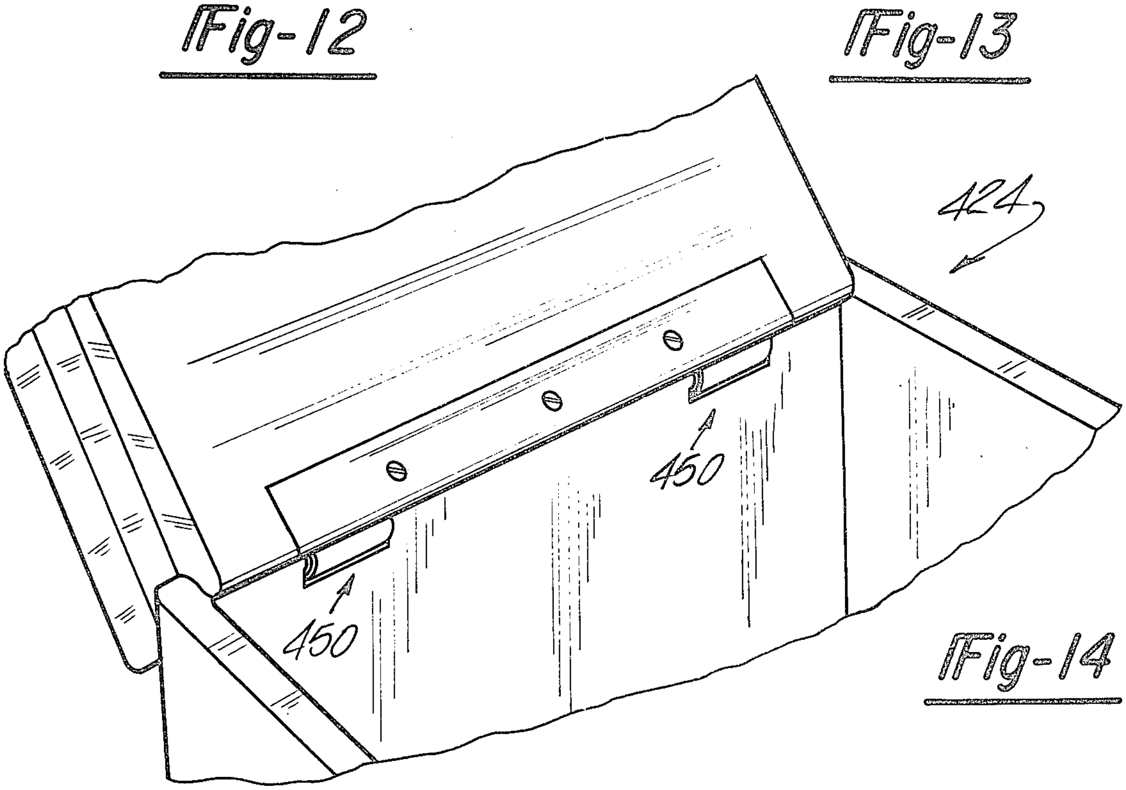
FIG. 14 is a perspective view of the collector container of the present invention illustrating another form of the hinge assembly of the present invention.
Figure 18:
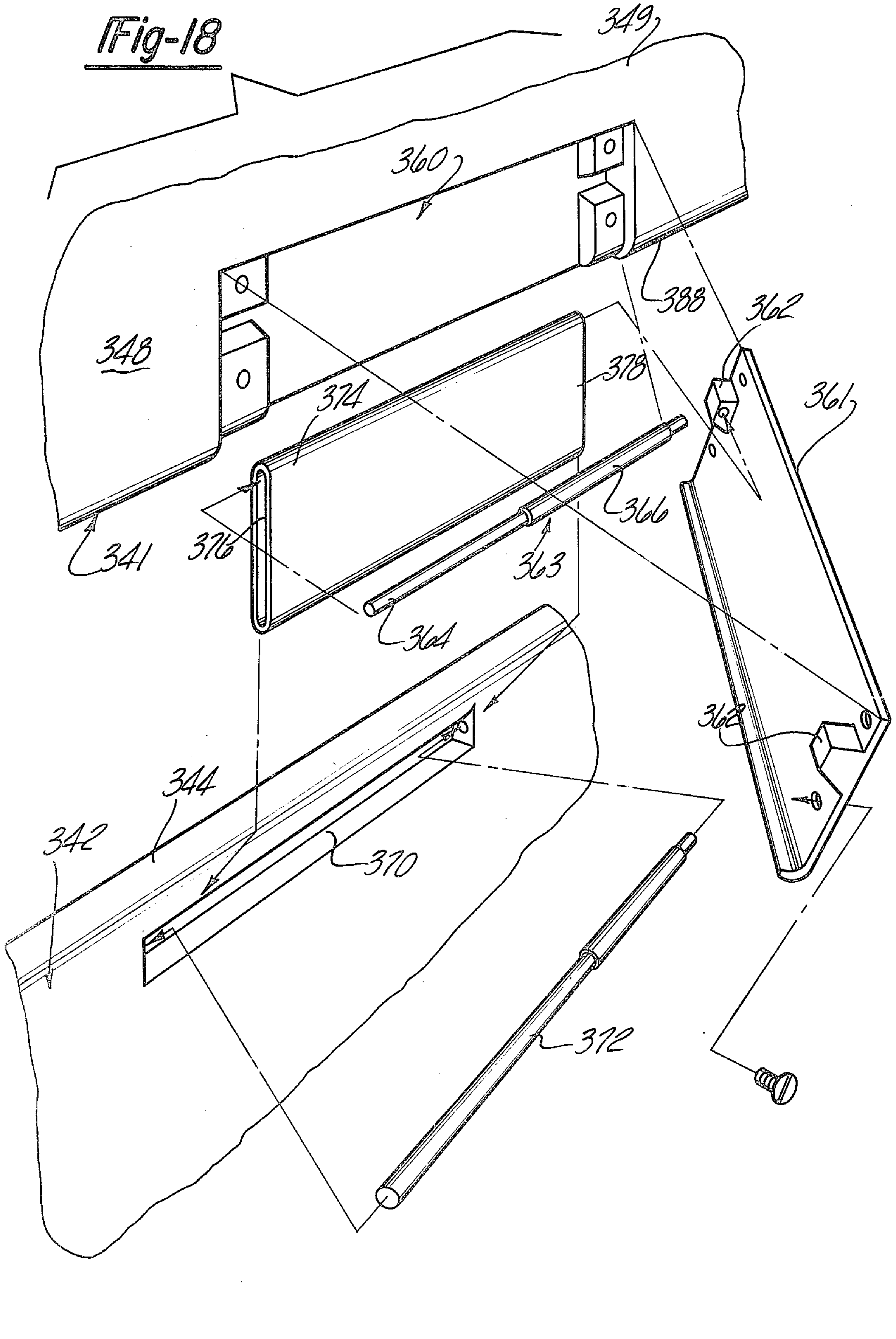
FIG. 18 is an exploded view of the hinge assembly which is illustrated in FIGS. 15-17.

FIG. 14 illustrates a container 424 having modified hinge assemblies 450. Each hinge assembly 450 is identical to the hinge assembly 350 described in connection with FIGS. 15–18, except that two assemblies 450 are employed and are positioned in a spaced apart relationship.

The auxiliary collector container 20 is similar in construction to the trash collector containers 24, 224, 324, and 424 except that the container 20 is not mounted on wheels. The cover members 23 on the trash collector containers 20, when moved to the open position, serve as a backstop against which thrown trash will deflect into the receptacle. Consequently, the walls adjacent the container 20 will require less cleaning.

Figure 10:
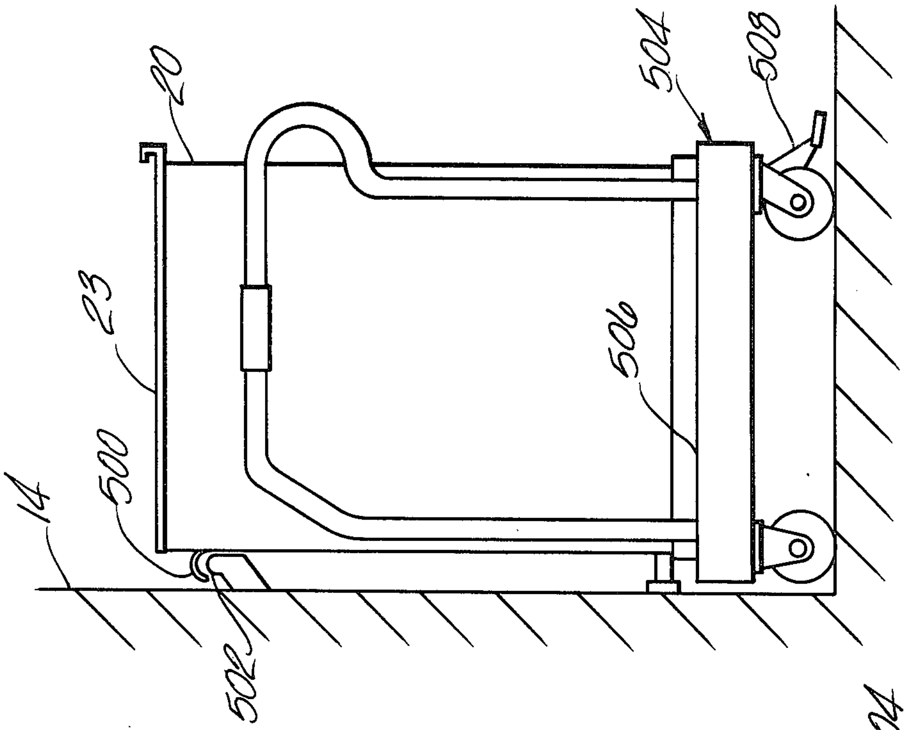
FIG. 10 is an elevational view of a trash collector container similar to the trash collector container shown in FIG. 3 but lacking wheels and instead being equipped for hanging on a wall.
Figure 9:
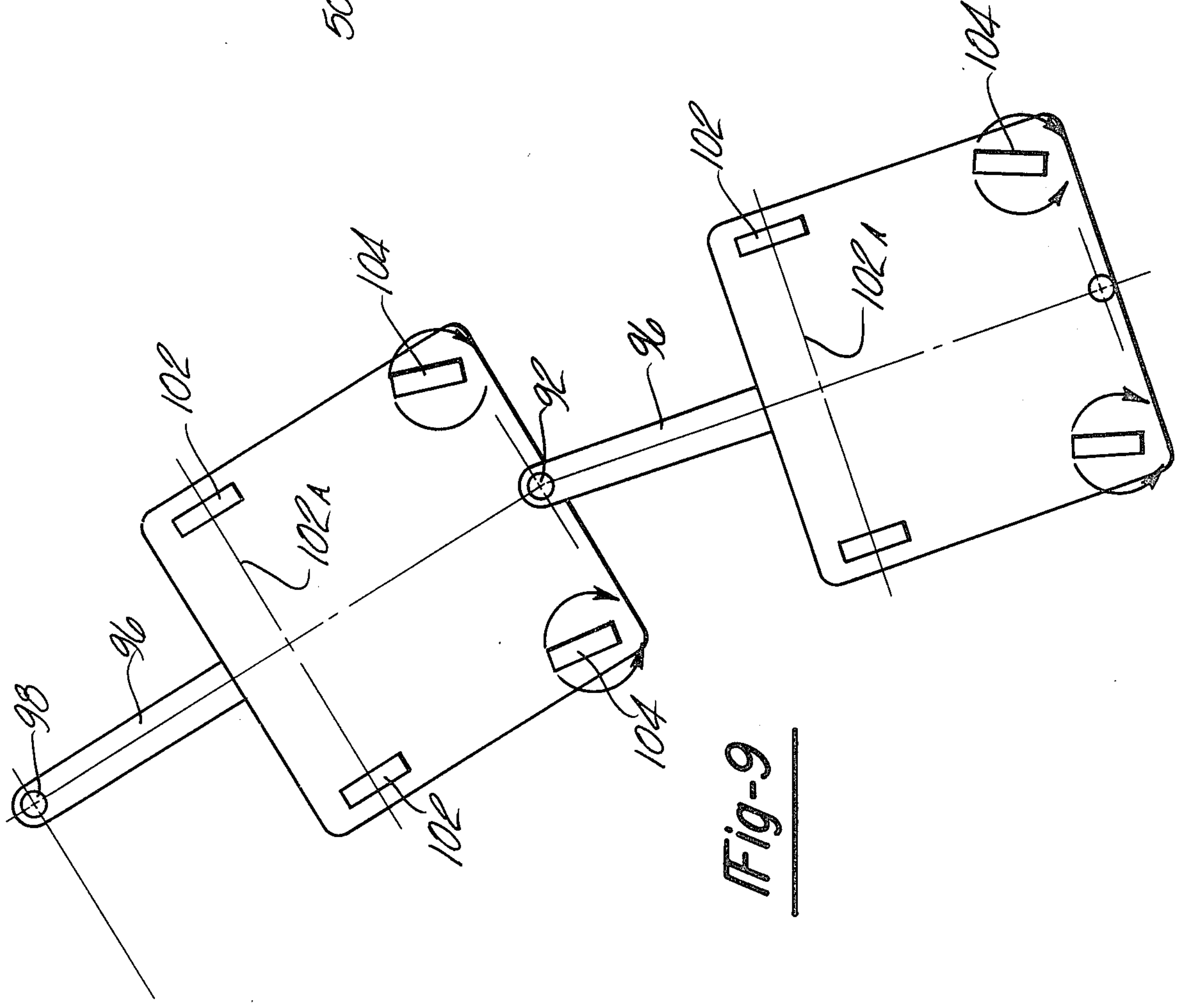
FIG. 9 is a diagrammatic plan view illustrating the dimensional relationship between the wheels and the tongue-and-hitch assemblies of a pair of coupled trash collector containers.

As shown in FIG. 10, the container 20 can be mounted by means of an inverted U-shaped hanger 500 onto a projecting rail 502 that is secured to the wall panel 14. If the container 20 should become filled with material and is too heavy to be lifted manually, a cart 504 is provided having a platform 506 that can be elevated by depressing the pedal 508 to lift the container 20 from the rail 502. The cart 504 enables the container 20 to be carried to a location where it can be emptied.

From the above description, it can be seen that an improved trash collection, transportation, management and disposal system is provided enabling the efficient removal of trash from an office environment. The trash removal system of this invention uses improved trash collector containers which serve as collectors and transporters of trash. Consequently, fewer load transfers are required, and the system is better capable of handling unexpected increases of trash in any area. The hinged covers for the trash collector containers function to seal the containers when they are closed and to serve as a backstop when opened deflecting the trash into the container. The containers are durable, easily cleaned and have an attractive appearance compatible with modern office decor.

What is claimed is:

1. A trash collection, transport, and management system for an office environment that includes upright walls, walkways between said walls, and furniture such as desks positioned against said walls, said system comprising a plurality of trash receptacles of substantially desk top height for receiving trash generated in said environment, storing said trash and transporting the trash to a remote dump site, each of said receptacles having an open upper end, a bottom wall, a front wall, a back wall, a pair of side walls, a cover movably supported on said back wall for pivotal movement between an upright open position adjacent one of said office walls and a closed position overlying said open upper end, a pair of casters secured to said bottom wall at one end thereof and a pair of fixed position wheels secured to said bottom wall at the opposite end thereof, means operable to pivotally connect two or more of said receptacles for movement as a train of receptacles through said walkways, and one or more dumping mechanisms adapted to be located at said dump site, each of which is operable to pivot one of said receptacles about a single fixed and substantially horizontal axis from an upright position upon said walkway to an elevated and substantially inverted position over said dump site wherein said cover is moved to a substantially open position, said axis being located above said upper end of said one receptacle in said upright position therof upon the walkway and spaced horizontally therefrom in a direction toward said dump site.

2. The system according to claim 1 wherein each of said dumping mechanisms comprises a stand member, a support member pivotally mounted on said stand member for movement relative thereto about said substantially horizontal axis, said support member being adapted to fixedly support said receptacle, and fluid actuated cylinder means secured to said stand member and engageable with said support member operable to move said support member about said axis through an angle substantially in excess of 90 degrees.

3. A trash collection, transport, and management system for an office environment that includes upright walls, walkways between said walls, and furniture such as desks positioned against said walls, said system comprising a plurality of trash receptacles of substantially desk top height for receiving trash generated in said environment, storing said trash and transporting the trash to a remote dump site, each of said receptacles having an open upper end, a bottom wall, a front wall, a back wall, a pair of side walls, a cover movably supported on said back wall for pivotal movement between an upright open position adjacent one of said office walls and a closed position overlying said open upper end, a pair of casters secured to said bottom wall at one end thereof and a pair of fixed position wheels secured to said bottom wall at the opposite end thereof, means operable to pivotally connect two or more of said receptacles for movement as a train of receptacles through said walkways, and one or more dumping mechanisms adapted to be located at said dump site, each of which is operable to move one of said receptacles from an upright position to a substantially inverted position wherein said cover is moved to a substantially open position, each of said dumping mechanisms comprising a stand member, a support member pivotally mounted on said stand member for movement relative thereto about a substantially horizontal axis, said support member being adapted to support said receptacle, and fluid actuated cylinder means secured to said stand member and engageable with said support member operable to move said support member about said axis, each of said receptacles further including a pair of brackets secured to the underside of said bottom wall, each of said brackets including a mounting portion, a depending portion extending downwardly from said bottom wall and a substantially horizontal portion extending transversely of said receptacle, said brackets thus providing a pair of guideways located between said bottom wall and said horizontal portions and extending longitudinally of said receptacle, and said dumping mechanism support member having a bottom portion having a substantially U-shape cross section including a pair of end portions which terminate in a pair of oppositely extending horizontal flanges, said flanges being adapted to fit in said guideways so that said flanges coact with said brackets to provide releasable support of said receptacle on said support member and maintain said receptacle in a fixed relation with respect to said support member throughout said movement about said axis.

4. A trash collection, transport, and management system for an office environment that includes upright walls, walkways between said walls, and furniture such as desks positioned against said walls, said system comprising a plurality of trash receptacles of substantially desk top height for receiving trash generated in said environment, storing said trash and transporting the trash to a remote dump site, each of said receptacles having an open upper end, a bottom wall, a front wall, a back wall, a pair of side walls, a cover movably supported on said back wall for pivotal movement between an upright open position adjacent one of said office walls and a closed position overlying said open upper end, a pair of casters secured to said bottom wall at one end thereof and a pair of fixed position wheels secured to said bottom wall at the opposite end thereof, and means operable to pivotally connect two or more of said receptacles for movement as a train of receptacles through said walkways, said means operable to pivotally connect two or more of said receptacles comprising a pin secured to said bottom wall at one end of said receptacle, said pin extending downwardly from said bottom wall and terminating in a rounded nose portion, a hinge member secured to said receptacle at the opposite end thereof and a tongue member mounted on said hinge for movement about a horizontal axis between a vertical position adjacent said receptacle and a horizontal position extending outwardly from said receptacle in which the vertical level of said tongue is substantially lower than the vertical level of said pin nose portion, said hinge being spring-stressed so as to urge said tongue toward said vertical position and said tongue having an opening positioned therein so that said pin nose on an adjacent receptacle fits into said opening, said pin and said tongue thus cooperating to pivotally connect said receptacles.

5. The system according to claim 4 wherein the distances from said fixed position wheels to said opening and from said pin nose to said fixed position wheels are substantially equal.

* * * * *